Figure 1:
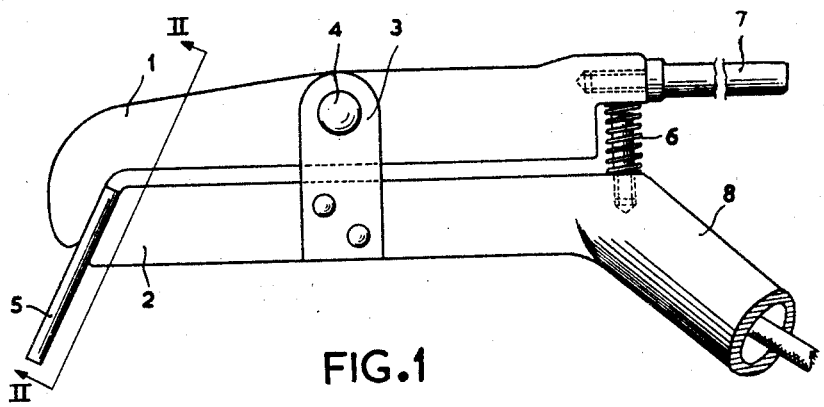

INVENTOR
GERRIT ZOETHOUT
JOHANNES ANTONIUS NICOLAAS CLEVERS

AGENT

United States Patent Office 2,818,495
Patented Dec. 31, 1957

2,818,495

ELECTRODE HOLDER

Gerrit Zoethout and Johannes Anthonius Nicolaas Clevers, Eindhoven, Netherlands, assignors, by mesne assignments, to North American Philips Company, Inc., New York, N. Y., a corporation of Delaware Application March 13, 1956, Serial No. 571,348

Claims priority, application Netherlands March 23, 1955

2 Claims. (Cl. 219—138)

The present invention relates to an electrode holder for use in welding apparatus. More particularly, the invention relates to an electrode holder used for filling a butt weld, which extends substantially in a vertical direction between the sides of at least two parts which are required to be secured to one another with weld-metal. The seam is enclosed by means of at least one auxiliary member in order to prevent metal from escaping at the sides of the seam. The holder comprises two clamping jaws which are secured to one another so as to be movable, and a clamped electrode extends in the direction in which the clamps are disposed relatively to one another.

In the above-described welding method, in order to permit the welding point to be reached by an electrode it is frequently necessary for the clamping jaws to be introduced into the seam when use is made of the usual straight electrode. Since the seam is enclosed, the electrode usually has to be arranged in the seam at its full length in order to ensure that the electrode end adjacent the arc occupies the correct position for welding. Consequently, the electrode holder to which the invention relates has to satisfy exacting requirements. In the above-described welding method the width of the seam is at a maximum of the order of 20 mms., so that the electrode holder cannot be prevented from coming into contact with the work pieces to be secured to one another when it is introduced into the seam. Hence, special precautions must be taken with respect to the insulation of the electrode-holder.

It is known to coat the clamp jaws of electrode holders with an insulating layer. In view of the very limited dimensions which an electrode-holder is allowed to have in the above-described welding method, and in view of the very high temperatures which are produced in the enclosed seam, it is difficult to provide the electrode-holder with an insulating layer of sufficient thickness and temperature resistance. The temperatures produced may be of the order of 800° C.

According to the invention, the clamp jaws are made so narrow that they can be introduced into the seam between the parts to be joined to one another, one jaw consisting entirely of insulating material and the other jaw carrying current.

Since one clamp jaw is made completely of insulating material, the insulation problem described above is solved. This permits such proportioning of the clamp jaw which carries current that the said jaw is not likely to cause a short-circuit with the workpieces.

Preferably, the jaw which is made of insulating material consists of ceramic material consisting substantially of aluminium oxide, since the latter material is able to withstand very high temperatures, satisfies the requirements with respect to mechanical strength and does not crack when heated locally.

According to a further feature of the invention, the jaw which carries the current is not insulated and is designed with such a narrow width compared with the insulated jaw that, even when the clamped electrode is consumed, the current carrying jaw cannot come into contact with the enclosing parts of the seam, when the jaws are arranged in the seam between the parts to be joined.

Preferably, the current carrying jaw is arranged substantially between the jaw made of insulating material and the electrode end adjacent the arc, since in this manner the jaw made of insulating material embraces the jaw carrying current at the point at which the electrode is clamped, so that the fore-end of the electrode holder is also insulated.

Figure 2:
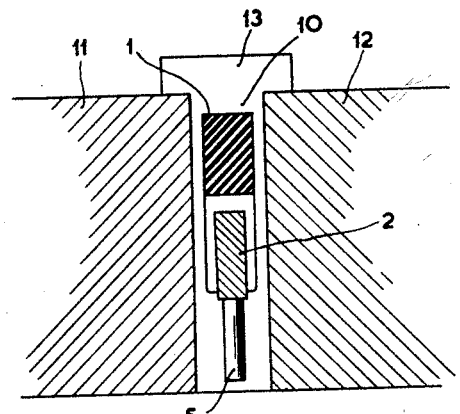

In order that the invention may readily be carried into effect, one embodiment thereof will be described in detail with reference to the accompanying drawing, in which:

Fig. 1 is a side-view of an electrode-holder in accordance with the invention; and Fig. 2 is a cross-sectional view of the holder shown in Fig. 1, the jaws being arranged between two metal sheets to be secured to one another.

In Fig. 1, jaws 1 and 2 are connected to one another by means of a connecting piece 3 so as to hinge about a pivot 4. An electrode 5 is arranged between the clamps 1 and 2 and is gripped by the action of a helical spring 6. At its rear end, the jaw 1 is provided with a projection 7 by means of which an electrode can be released. The rear end 8 of the jaw 2 is provided with the supply cable and acts as the handle of the electrode-holder. The rear end 8 is bent from the plane of the drawing relatively to the remainder of the jaw 2 for easier manipulation. The jaw 1 consists entirely of ceramic material, for example aluminium oxide, while the jaw 2 is made of copper.

In Fig. 2, the electrode-holder is arranged in the seam 10 between two sheets 11 and 12 required to be secured to one another. At the rear side, the seam 10 is closed by means of an auxiliary member 13. The auxiliary member to be arranged at the front side is omitted in the drawing for the sake of clarity. In the embodiment shown, the width of the seam is 15 mms., that of the jaw 1 is 10 mms. and that of the jaw 2 is 6 mms. The jaw 2 is made so narrow as to preclude the possibility of its coming into contact with the workpieces 11 and 12 when the holder is provided with an electrode.

While the invention has been described by means of a specific example and in a specific embodiment, we do not wish to be limited thereto, for obvious modifications will occur to those skilled in the art without departing from the spirit and scope of the invention.

What is claimed is:

1. An electrode holder in welding apparatus utilized to fill a butt-weld seam extending between the sides of a pair of workpieces, comprising a pair of clamping jaws, means for joining said jaws in a manner whereby they move relative to each other in a common plane, one of said jaws being constituted of an electrically insulating material and the other of said jaws being constituted of an electrically conductive material, said jaws having substantially elongated coplanar dimensions and being sufficiently narrow in width to adapt them to be operatively positioned in said seam, said electrically conductive jaw having a substantially reduced width relative to that of said electrically insulating jaw thereby preventing the said conductive jaw from contacting said workpieces while permitting the said insulating jaw to contact the said workpieces when the said jaws are operatively positioned in said seam, and an electrode, said jaws being adapted to clamp said electrode in said common plane.

2. An electrode holder in welding apparatus utilized to fill a butt-weld seam extending between the sides of a pair of workpieces, comprising a pair of clamping jaws, means for joining said jaws in a manner whereby they move relative to each other in a common plane, one of said jaws being constituted of ceramic material having an aluminum oxide base and the other of said jaws being constituted of electrically conductive material, said jaws having substantially rectangular cross-sectional areas having substantially elongated coplanar major dimensions and having sufficiently narrow minor dimensions to adapt them to be operatively positioned in said seam, said electrically conductive jaw having a substantially reduced minor dimension relative to that of said ceramic jaw thereby preventing the said conductive jaw from contacting said workpieces while permitting the said ceramic jaw to contact the said workpieces when the said jaws are operatively positioned in said seam, and an electrode, said jaws being adapted to clamp said electrode in said common plane.

References Cited in the file of this patent

UNITED STATES PATENTS

| | | |
|---|---|---|
| 1,851,039 | Fausek et al. | Mar. 29, 1932 |
| 2,270,724 | Brazitis et al. | Jan. 20, 1942 |